United States Patent
Silander

(10) Patent No.: US 8,084,910 B2
(45) Date of Patent: Dec. 27, 2011

(54) ROTOR STRUCTURE FOR A PERMANENT-MAGNET MACHINE

(75) Inventor: Eino Silander, Klaukkala (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 11/793,709

(22) PCT Filed: Dec. 23, 2005

(86) PCT No.: PCT/FI2005/000548
§ 371 (c)(1),
(2), (4) Date: Feb. 11, 2008

(87) PCT Pub. No.: WO2006/067274
PCT Pub. Date: Jun. 29, 2006

(65) Prior Publication Data
US 2008/0150385 A1 Jun. 26, 2008

(30) Foreign Application Priority Data
Dec. 23, 2004 (FI) ..................... 20041667

(51) Int. Cl.
*H02K 1/27* (2006.01)
*H02K 21/12* (2006.01)
(52) U.S. Cl. ......... 310/156.23; 310/156.31; 310/156.12; 310/156.13; 310/156.05; 310/156.03; 310/156.43
(58) Field of Classification Search ............ 310/156.03, 310/156.3, 156.31, 152, 156.12, 156.13, 310/156.23, 156.05, 153.43; *H02K 1/27*
See application file for complete search history.

(56) References Cited

U.S. PATENT DOCUMENTS

| | | | |
|---|---|---|---|
| 4,117,360 A * | 9/1978 | Richter | 310/183 |
| 4,525,925 A * | 7/1985 | Jones | 29/598 |
| 4,639,627 A | 1/1987 | Takekoshi et al. | |
| 4,855,630 A | 8/1989 | Cole | |
| 5,162,685 A | 11/1992 | Yamaguchi et al. | |
| 5,548,172 A | 8/1996 | Kliman et al. | |
| 5,650,680 A | 7/1997 | Chula | |
| 5,838,082 A * | 11/1998 | Ito et al. | 310/90.5 |
| 5,936,323 A | 8/1999 | Shibukawa et al. | |
| 6,104,115 A * | 8/2000 | Offringa et al. | 310/156.28 |
| 7,233,090 B2 * | 6/2007 | Evans et al. | 310/156.57 |

(Continued)

FOREIGN PATENT DOCUMENTS

CN 1505821 A 6/2004

(Continued)

OTHER PUBLICATIONS

Malmberg, WO 02/103882 A1, Dec. 27, 2002.*

(Continued)

*Primary Examiner* — Quyen Leung
*Assistant Examiner* — Terrance Kenerly
(74) *Attorney, Agent, or Firm* — Buchanan Ingersoll & Rooney PC

(57) ABSTRACT

The object of the invention is a rotor for a permanent-magnet synchronous machine in which a pole structure is fitted onto the surface of the rotor body structure facing the air gap. Each of the rotor's pole structures comprises at least one permanent magnet and a shell structure fitted on top of it. According to the invention, an intermediate layer made of magnetic composite is fitted between the permanent magnet and the shell structure.

12 Claims, 2 Drawing Sheets

U.S. PATENT DOCUMENTS

Figure 1:
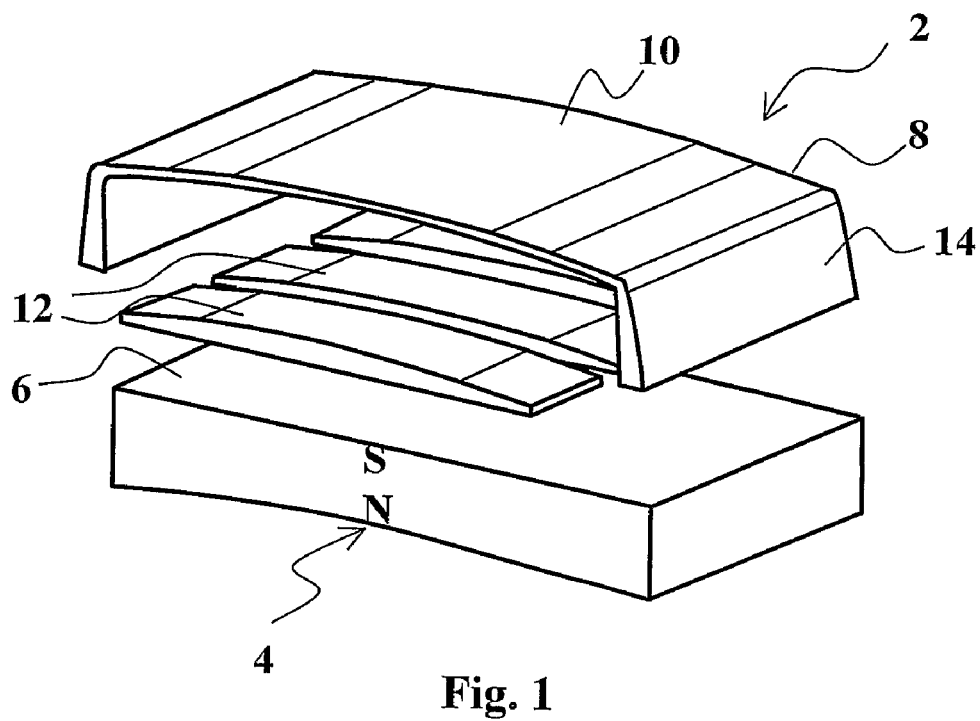

| | | | |
|---|---|---|---|
| 7,250,703 B2 * | 7/2007 | Nitta et al. | 310/156.53 |
| 7,285,890 B2 * | 10/2007 | Jones et al. | 310/156.19 |
| 2002/0079997 A1 * | 6/2002 | Godkin | 335/220 |
| 2003/0048101 A1 * | 3/2003 | Tola | 324/207.25 |
| 2003/0102759 A1 | 6/2003 | Shah et al. | |
| 2004/0103521 A1 * | 6/2004 | Reiter et al. | 29/598 |
| 2004/0150281 A1 * | 8/2004 | Malmberg | 310/156.28 |
| 2004/0232794 A1 * | 11/2004 | Hsu | 310/156.56 |
| 2005/0035677 A1 * | 2/2005 | Evans et al. | 310/156.35 |
| 2005/0200232 A1 * | 9/2005 | Laing | 310/254 |
| 2007/0290564 A1 * | 12/2007 | Clark | 310/156.29 |

FOREIGN PATENT DOCUMENTS

| | | |
|---|---|---|
| DE | 1 152 515 A2 | 11/2001 |
| DE | 102 16 476 A1 | 10/2003 |
| DE | 10217977 A1 | 11/2003 |
| EP | 0 955 714 A2 | 11/1999 |
| EP | 1 383 143 A1 | 1/2004 |
| FR | 2 606 949 | 5/1988 |
| JP | 56-19367 | 2/1981 |
| JP | 9-84283 A | 3/1997 |
| JP | 2002186208 * | 6/2002 |
| WO | WO 02/103882 A1 | 12/2002 |
| WO | WO2004051824 * | 6/2004 |

OTHER PUBLICATIONS

Machine translation of JP2002186208, Miyamoto et al., Jun. 28, 2002.*
PCT/ISA/210.
PCT/ISA/237.
Finnish Search Report.

* cited by examiner

ROTOR STRUCTURE FOR A PERMANENT-MAGNET MACHINE

The object of the invention is a rotor for a permanent-magnet synchronous machine according to the preamble part of Claim 1.

Several solutions for the placement and fastening of permanent magnets have been proposed for permanent-magnet synchronous machines. The permanent magnets are fitted either on the surface of the rotor or in openings formed within the rotor sheet pack. These are referred to as surface magnets and embedded magnets, correspondingly. Surface magnets are installed essentially circumferential to the rotor, with the result that the rotor pole essentially comprises a permanent magnet. Embedded magnets are installed similarly in the circumferential direction of the rotor or in a position that results in two or more magnets creating a rotor pole between them through their combined effect. The permanent magnets can be in a V arrangement relative to each other, for example.

The intention of the positions and placement of the permanent magnets is to produce the best possible excitation power and optimal mechanical construction for the machine's application. In addition to the total excitation power produced, efficient utilisation of excitation power is essential in order to achieve the desired effect. A very significant factor for ensuring trouble-free and efficient operation is the variation of magnetic flux generated in the machine's air gap. The general objective is to create an air gap flux that varies as sinusoidally as possible. A permanent-magnet synchronous machine implemented with embedded magnets in which the air gap flux is made sinusoidal by shaping the outer circumference of the rotor is known from the publication EP0955714, for example. The outer edges of the sheets forming the rotor have been cut into a waved shape so that the air gap is narrower at the middle of the pole compared to its edges.

The above procedure is not possible in machines with the permanent magnets fitted onto the rotor surface because the permanent-magnet pieces constitute the outermost part. The shaping of permanent magnets is difficult and expensive due to the hardness and properties of the material. On the other hand, it is most often difficult to shape the outer circumference in a similar manner and fasten the permanent magnets onto the shaped surface.

The objective of the invention is to create a new rotor for a permanent-magnet synchronous machine in which the air gap flux generated in the machine's air gap is distributed as advantageously as possible. In order to achieve this, the invention is characterised by the features specified in the characteristics section of Claim 1. Some other preferred embodiments of the invention have the characteristics specified in the dependent claims.

The solution according to the invention makes it possible to shape the surface of the pole structure facing the air gap—that is, the outer surface of the pole piece—so that the air gap flux is essentially sinusoidal, resulting in even torque and minimal vibrations and noises caused by harmonics. The properties of composite material make it easy to shape the pole structure exactly as desired. In terms of manufacturing technology, the solution according to the invention is advantageous. The parts can be manufactured separately and assembled into rotor poles without having to interfere with the actual body structure of the rotor or the rotor sheet pack.

Composite material manufactured from powder metal can be cast into the desired shape as well as treated to implement an advantageous magnetic orientation. The solution contributes to low iron losses as eddy currents do not occur in composite material.

The sandwich structure according to the invention protects the permanent magnets from demagnetisation in case of short-circuit, for example. The solution proposed in the invention improves corrosion protection, and in many applications, fastening the permanent magnets becomes easier.

According to another preferred embodiment of the invention, the permanent-magnet pieces that are difficult to machine may have straight edges, which will significantly facilitate manufacturing.

Figure 2:
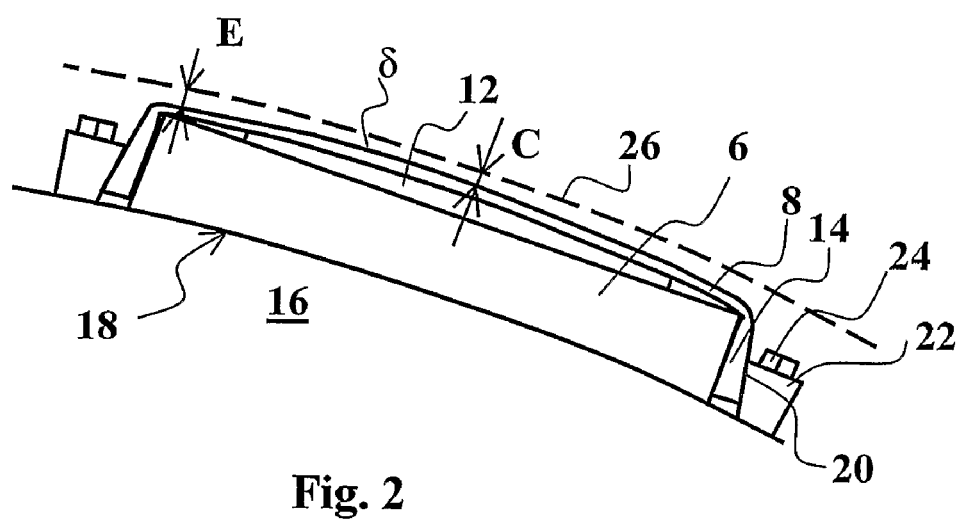

The invention will be described in detail with the help of a certain embodiment by referring to the enclosed drawings, where FIG. 1 illustrates the parts of a pole according to the invention, FIG. 2 illustrates a pole according to the invention fastened to a rotor.

Figure 3:
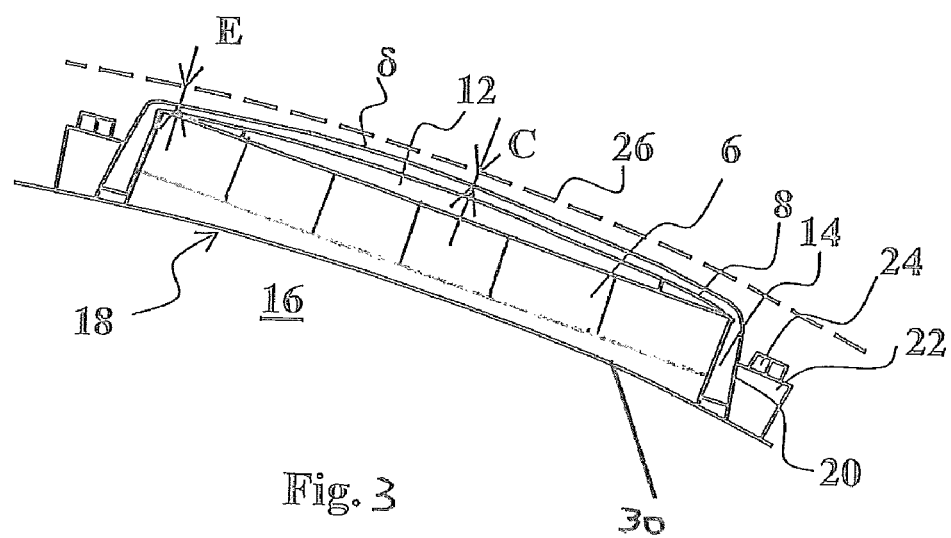

FIG. 3 illustrates a pole according to the invention fastened to a rotor.

FIG. 1 illustrates the structure 2 of a permanent-magnet pole in a machine according to the invention. The structure comprises a permanent magnet 6 with its lower edge 4 against the rotor body that consists of a sheet pack assembled of sheets, for example. In the illustrated example, the lower edge 4 of the permanent magnet is slightly concave, corresponding to the outer circumference of the machine's rotor. The permanent magnet can consist of several separate pieces that are placed adjacent to each other and jointly comprise a single permanent-magnet pole. There may be several permanent-magnet pieces in the axial direction as well as in the circumferential direction of the rotor. The permanent-magnet pieces of a single pole are formed so that the N pole of each piece faces the rotor body and the S pole faces the air gap $\delta$ (FIG. 2) and the stator as illustrated, or correspondingly, the S pole faces the rotor body and the N pole faces the air gap and the stator. The adjacent permanent-magnet pieces within a pole are glued together at their lateral surfaces using a suitable adhesive.

An intermediate layer 12 is installed on top of the permanent-magnet pieces. It consists of magnetic composite material and is manufactured using the powder metal technique. The intermediate layer has good magnetic permeability and low iron losses. The intermediate layers 12 are preferably formed of several pieces parallel to each other in the axial direction of the machine, making them easy to handle. In the tangential direction, the length of the pole structure is essentially equal to the width of the pole, and the outer surface of the pole structure facing the air gap $\delta$ is shaped in a manner that generates the desired air gap flux—that is, as sinusoidal as possible. As the intermediate layer 12 extends over several permanent-magnet pieces, it also binds the permanent-magnet pieces together on the top. Thus the permanent-magnet pieces and the intermediate layer 12 jointly comprise a strong sandwich structure. The intermediate layer also protects the permanent magnets from demagnetisation in case of short-circuit, for example. The intermediate layer is preferably manufactured of soft magnetic composite (SCM) that is sold under the name SOMALOY®, for example. The composite material is manufactured using the powder metal technique and has a high density and good magnetic properties.

A shell structure 8 is fitted on top of the intermediate layer and shaped to correspond to the profile of the intermediate layer. The top surface 10 of the shell structure, facing the machine's air gap, is curved similarly to the outer surface of the intermediate layer. The inner surfaces of the edge sections 14 of the shell structure touch the edge of the permanent magnet 6. The edge sections 14 become slightly thicker at the end facing the rotor, which means that the clamping bar corresponds to the outer surface of the edge section 14 as described in connection with FIG. 2. The shell structure is manufactured of fibre-reinforced plastic suitable for the purpose. The shell structure is implemented as described in the application WO02103882, for example.

FIG. 2 illustrates the structure assembled of the parts in FIG. 1 fastened on the outer circumference of a rotor 16. The permanent magnet 6 is glued at its concave bottom surface onto the convex outer circumference 18 of the rotor. The edge sections 14 of the shell structure are widened, and a clamping bar 22 is fitted against their outer surface 20, fastened by bolts 24 to the rotor 16. Reference is made to the application WO02103882 also in this respect. The inner circumference of the machine's stator is marked with the dashed line 26. According to the invention, the distance between the permanent-magnet pole and the inner circumference of the stator is smaller at the middle of the pole, dimension C, than at the edge of the pole, dimension E.

Many variations are possible upon application of the invention. The permanent-magnet pieces can comprise several parts, making it possible to compose the permanent magnets forming a pole in different machines using modular pieces, for example. The permanent-magnet pole is preferably pre-manufactured as a uniform structure that is fastened onto the rotor during the manufacture of the machine. The rotor can be manufactured of a sheet pack or an integral piece.

In the example of FIG. 2, the outer circumference of the rotor is curved. The rotor body can also be manufactured so that there are flat surfaces at the positions of the poles, and the pole structure is fastened onto these. In this case, the bottom surface of the permanent magnet is similarly flat. There may also be a spacer 30 between the permanent magnet and the rotor body structure through which the pole structure is connected to the rotor body. In this case, the spacer 30 is preferably included in the pole structure.

In the above, the invention has been described with the help of certain embodiments. However, the description should not be considered as limiting the scope of patent protection; the embodiments of the invention may vary within the scope of the following claims.

The invention claimed is:

1. A rotor for a permanent magnet synchronous machine comprising:
   a rotor body structure;
   a pole structure fitted on a surface of the rotor body structure facing an air gap, wherein said pole structure comprises a plurality of permanent magnet pieces, and a shell fitted thereon; and
   an intermediate layer formed of a magnetic composite fitted between the plurality of permanent magnet pieces and the shell structure, extends over at least two permanent magnet pieces and binds the at least two permanent magnet pieces together.

2. A rotor according to claim 1, wherein the outer surface of the pole is shaped so that the magnetic flux generated by the permanent magnets in the air gap has an essentially sinusoidal distribution.

3. A rotor according to claim 1, wherein the permanent magnets are fastened directly to the rotor body structure.

4. A rotor according to claim 1, wherein the permanent magnets are fastened to the rotor body structure using a spacer.

5. A rotor according to claim 1, wherein an outer surface of the shell structure faces the air gap.

6. A rotor according to claim 1, wherein an outer surface of the pole structure faces the air gap.

7. The rotor according to Claim 1, wherein the magnetic composite is formed of a surface insulated iron powder.

8. The rotor according to claim 1, wherein the magnetic composite is formed of a surface insulated iron powder.

9. The rotor according to claim 1, wherein the intermediate layer is formed of a plurality of pieces arranged in parallel to each other.

10. The rotor according to claim 1, wherein the intermediate layer has a substantially flat inner surface and a curved outer surface.

11. A permanent magnet synchronous machine, comprising:
    a stator;
    a rotor body structure;
    a pole structure fitted on a surface of the rotor body structure facing an air gap, each pole structure comprises a plurality of permanent magnet pieces and a shell structure fitted on the plurality of permanent magnet pieces, wherein an intermediate layer made of magnetic composite formed by a powder metal technique is fitted between the plurality of permanent magnet pieces and the shell structure, extends over at least two permanent magnet pieces and binds two permanent magnet pieces together.

12. The permanent magnet synchronous machine according to claim 11, wherein the magnetic composite is formed of a surface insulated iron powder.

* * * * *